3,005,725
Patented Oct. 24, 1961

3,005,725
OIL PELLETED CARBON BLACK

Alton E. Daniell, Fritch, Tex., assignor to United Carbon Company, Inc., Houston, Tex., a corporation of Maryland
No Drawing. Filed Dec. 10, 1959, Ser. No. 858,601
6 Claims. (Cl. 106—307)

This invention relates to carbon black. More particularly, it relates to pelleted carbon black. Still more particularly, it relates to an improved process for preparing an oil-bearing peleltedcarbon black particularly adapted for use in printing inks, and the pelleted product produced thereby.

The pelleting of rubber-grade carbon black to minimize the disadvantages inherent in finely divided carbon black has been practiced for a number of years. In general, pelleting has been conducted either as a dry process in the absence of a liquid or as a wet process in which a liquid, usually water, is added to the carbon black. In the former process, loose black is agitated in appropriate equipment until pellets are formed. In the latter, loose black and water are mixed to form a wet mixture which is then agitated to form pellets. The incorporation of an extender oil in the pellets to give an oil-bearing black also has been practiced. Oil has been added alone or as an emulsion to loose black which is then pelleted, or alone or as an emulsion to dry preformed pellets. Pellets formed by either the wet or dry process, whether oil-bearing or oil-free, have proved to be attainable in a density range providing sufficient hardness to withstand breakage during handling, shipping and storage and also providing sufficient softness to be readily distintegrated and dispersed in rubber.

When either of these processes is practiced on ink-grade carbon black, however, the resultant pellets leave much to be desired. This appears to be due, at least in part, to the apparently different physical and chemical properties of ink-grade carbon black as well as to processing requirements peculiar to the printing ink industry. It has been particularly difficult to obtain pellets by either process which overcome the problem of fines and which may also be readily incorporated in an ink vehicle. When the pellet density is high enough to withstand handling and shipping, dispersion in the vehicle is difficult. When the density is low enough to permit dispersion, the pellets become fragile and cannot satisfactorily withstand normal handling. The processes are even less successful when a printing ink oil is incorporated in the pellets to meet the requirements of the ink industry. For instance, it is difficult to obtain a uniform distribution of oil when the procedure involves spraying dry preformed pellets, while the addition of oil to loose black results in poor pellet formation. By either method, moreover, it is difficult to closely control the ratio of oil to carbon black.

There has continued to remain, therefore, a demand for an improved process of preparing carbon black pellets which are particularly suited for use in printing inks. It is a principal object of this invention to provide such a process. It is a further object of this invention to provide a process for preparing ink-grade carbon black pellets that are not subject to the disadvantages associated with known processes. It is a still further object of this invention to prepare ink-grade carbon black pellets of a preselected density, particularly a density which will provide the hardness to withstand breakage during handling, shipping and storage and also the softness to permit ready disintegration and dispersion in printing ink vehicles. A further object of this invention is to form ink-grade carbon black pellets of a preselected uniform size range, particularly a size range suited for use in the preparation of printing inks. It is also an object of this invention to provide a process for preparing oil-bearing ink-grade carbon black pellets in which the oil to carbon black ratio is easily and accurately controlled and a uniform distribution of oil is obtained. Another object is to provide a process for producing oil-bearing carbon black pellets which is simple in operation and may be readily practiced in conventional pelleting equipment in an economical manner and with a minimum of supervision.

Surprisingly, these objects have been met in a simple and straight-forward, yet unusually effective manner. In general, the process of this invention involves the addition of water to loose carbon black to form a wet mixture. As in the known wet process, this mixture is then agitated to initiate the formation of pellets. After formation of the pellets has been initiated, an aqueous emulsion of an oil is added and agitation continued until pelleting is complete and a uniform distribution of the oil is obtained. The product is then subjected to drying in a normal manner to reduce the water content leaving oil-bearing carbon black pellets.

Although the proces has so far been rather generally and simply described, there are certain limitations that should be observed in order to obtain a product having optimum characteristics. These limitations are more fully described below.

The carbon black to which the instant process is particularly directed is that special grade of carbon black intended for use in printing inks. For the purposes of this invention, it is believed sufficient to state that it is offered in commerce under various well known trademarks, and that its methods of preparation and its characteristics and properties are recorded in numerous places among which may be mentioned the American Ink Maker, April 1952. While the process of this invention may be readily adapted for use with rubber-grade carbon black, the problems presented by the pelleting of ink-grade black are substantially non-existent or at least hardly of the same magnitude when pelleting rubber-grade black, so that the advantages enjoyed when employing the instant invention with the former may not exist with the latter. Nevertheless, there is no reason why a rubber-grade carbon black cannot be easily and satisfactorily treated by the process of this invention to form oil-bearing pellets.

While it is possible to pellet carbon black using any of various liquids, nevertheless, none could prove to be more practical than water. Water, therefore, constitutes the preferred liquid employed in the instant process, the total amount of which is similar to that employed in the known wet process. Accordingly, the total water content may vary considerably from as little as about 90% by weight of the carbon black to as high as about 165% and even higher, although much beyond 165% is not recommended. For optimum results, the total water content will usually be about 100–140% by weight of the carbon black. It is a feature of this invention, however, that, unlike the wet process, the entire water content is not added directly to the loose carbon black. Instead, a controlled amount of the total water content sufficient to form a wet mixture treatable to initiate pellet formation is initially added. This amount may vary from about 70–80% of the total water content. If too little water is added, the initiation of pellet formation may prove difficult while if all the water is initially added, final pellets of too high a density may be formed.

The wet mixture thus formed is then subjected to agitation in any conventional wet pelleting equipment such as that disclosed in U.S. Patent No. 2,167,674 or 2,288,087. While the water may be added to the loose carbon black in any manner, it is desirable to spray it on as the black is agitated in the pelletizer, thus obtaining a better distribution. Agitation of the mixture is continued until pellets begin to form having a density and the size approaching preselected values. For the purpose to which the pellets of this invention will be employed, i.e., in inks, the desired density will range from about 16–20 lbs./cu. ft. and the pellet size from about +20 —60 mesh U.S. standard sieve series. Both density and size vary with the time of agitation which in turn is dependent upon intensity of agitation and the like. Accordingly, the time required for initial pelleting will vary as the operating conditions vary. For any fixed set of conditions, however, the time required for obtaining the desired results may be readily determined by experienced observation. It can be stated, however, that initial pelleting will usually require some 4–8 minutes.

As the pellets approach the desired density and size values, an oil is added thereto which is compatible with the ink formulation in which the carbon black pellets will subsequently be used. The presence of an oil is generally a requirement of the ink manufacturer, since the oil tends to decrease the wetting out time of the pellets when added to an ink vehicle. Usually, therefore, the oil will be the same as the ink vehicle which may be any of the well known oils used for this purpose such as linseed oil, any of the various mineral oils, news ink vehicle oils and the like. In addition, however, oil lends physical stability to the pelleted product. If oil-free pellets of a density suitable for use in inks, i.e., about 16–20 lbs./cu. ft., are dried so that the moisture content is substantially negligible, they become quite fragile and readily crumble and disintegrate. This fragility, on the other hand, appears to be considerably reduced in the oil-bearing pellets according to this invention, the oil content of each pellet apparently holding it together and minimizing disintegration thereof. The addition of oil during pelleting as practiced herein, moreover, also appears to influence the pelleting action. Thus, its presence tends to resist an increasing of the pellet density during further agitation of the pellets which, in the absence of the oil, would probably occur.

The amount of oil employed to obtain the desired results may be quite widely varied. As little as 3% by weight of the carbon black has demonstrated advantage. This amount may be increased considerably to as much as 25% and even higher. If too great an amount of oil is used, however, the resulting product begins to become unprofitable. In addition, however, the continued agitation necessary to uniformly disperse large amounts of oil in the pellets results in pellets of an unsatisfactorily large size and, in some instances, even chunks. On the other hand, if too little oil is used, it has been found that pellet density tends to become too high. In general, therefore, while oil contents of lower and higher than about 5–20% may be employed with varying degrees of satisfaction, it has been found that optimum results in all respects are usually obtained when employing from about 5–20% oil by weight of the carbon black.

The addition of oil to the partially pelleted carbon black is made with the oil in the form of an aqueous emulsion and comprises the second step or stage of the process of this invention. The use of an emulsion serves several purposes. First, the additional water together with that initially added aids in more uniformly distributing the oil throughout the pellets. Second, a much more accurate control of the oil to carbon black ratio is possible. In order to fulfill these several purposes, it has been found that the composition of the emulsion may be quite widely varied. It will depend to some extent on the amount of water employed in the first stage of the process as well as on the amount of oil to be used. In general, the oil emulsion may range from about a 5% emulsion of oil in water to about 75%. About a 20–50% emulsion, however, has proved to be especially satisfactory.

The emulsion may be prepared readily by agitating a mixture of oil in water containing a small amount, usually 0.5–2.0% by volume based on the oil, of any of various known commercially available emulsifiers. As representative examples of such emulsifiers, there may be mentioned any of the polyoxyethyleneglycol esters of fatty acids, dialkyl quaternary ammonium chlorides, fatty alcohol amine sulfates and the like, although the particular emulsifier employed forms no part of this invention.

Addition of the emulsion to the partially pelleted black is preferably by spraying, while agitating, to insure a better distribution and to help avoid any undesirable density increase. Agitation of the resultant mixture of pellets and emulsion is continued until a uniform distribution of the oil throughout the pellets is obtained. The time required for this, as with initial pelleting, will also depend on similar variables and again can be readily determined for any set of conditions by experienced observation. It can be stated, however, that uniform oil distribution in pellets of a preselected density and size range will usually be obtained in some 5–10 minutes of additional agitation time.

According to the unique combination of steps constituting the process of this invention, a heretofore difficult to prepare pelleted ink-grade carbon black product of a preselected density and size range and having a preselected oil content uniformly distributed therethrough, can be simply and consistently produced. Exactly why the desired product is obtained by the instant process is not clearly understood, nor is there any desire of intension to limit the invention by any theory of operation. It appears, however, that water is necessary for good pelleting, little if any pelleting of the desired type being obtained when oil alone, or as an aqueous emulsion, is added directly to loose ink-grade carbon black. The reason for an aqueous emulsion being ineffective is not clear, but it may be that the oil in some manner affects the black as by preferentially wetting the surface of the black thereby hindering any pelleting action of the water. At any rate, according to the process of this invention, it has been found necessary to first agitate an aqueous oil-free wet mixture of carbon black in order to initiate proper pellet formation. Pelleting a wet mixture, moreover, appears to be essential to obtaining a uniform oil distribution in the following step. In this respect, it is again pointed out that a uniform distribution of oil in preformed dry pellets is exceedingly difficult to obtain. The reason for this is also not clear. It is a surprising and unexpected feature of this invention, however, that a uniform oil distribution is readily obtained when an aqueous oil emulsion is added to a partially pelleted wet mixture as prepared by the first step of this process.

After pelleting is complete, the pellets are subjected to drying to reduce the water content. Drying may be conducted in conventional equipment at normal drying temperatures without driving off the oil. Because of the presence of oil, the water content may be conveniently reduced to less than about 5.0% and, if desired, to as low as about 0.5–1.0%, the oil providing the necessary adhesion to protect the pellets against disintegration during normal handling and shipping.

The following examples further illustrate the invention. All parts are by weight unless otherwise noted.

*Example 1*

100 parts of loose, ink-grade carbon black commercially available under the trademark Elftex-8 are agitated in carbon black pelleting equipment of conventional design while water is added to it by spraying. A total of 122 parts of water are added and the mixture agitated for 3 minutes to initiate formation of pellets. A 40% aqueous emulsion of a printing ink vehicle parafinic mineral oil prepared by mixing 11 parts of oil and 17 parts of water using 0.5% by volume based on the oil of Arquad 2C, a dialkyl quaternary ammonium chloride, is then sprayed on the black while agitation is continued. Agitation is continued for an additional 5 minutes after which the pellets are removed from the pelletizing equipment and dried to a water content of about 0.5–1.0%. The final pelletted product has a density of 16.6 lbs./cu. ft. and a size range of 90% +20 −60 mesh U.S. standard sieve series. 5 gram samples of −10 mesh, +10 −20 mesh, +20 −60 mesh and fines are then weighed into extraction thimbles and 50 ml. portions of benzene placed in the extraction flasks and the black extracted for a period of two hours on the hot plate. The extraction solutions are evaporated on a water bath until no benzene odor is evident, heated in a 110° C. oven for 30 minutes and the extracts cooled in dessicators and weighed. The percent of extractable oil in each fraction is 9.24%, 9.06%, 9.25% and 9.02%, respectively, demonstrating that a uniform oil distribution is obtained in all pellets. The pellets demonstrate exceptional resistance to breakage under normal conditions, and disperse readily in commercially available printing ink vehicles.

*Example II*

100 parts of loose, ink-grade carbon black commercially available under the trademark Kosmos 60 are agitated as in Example I while 122 parts of water are added by spraying. After agitating for 7 minutes, an 18% aqueous emulsion of a printing ink mineral oil prepared by mixing 5 parts of oil and 23 parts of water using 0.5% by volume based on oil of Ethofat 142/15, a polyoxyethyleneglycol ester of fatty acids, as a surface active agent, is then sprayed on the black while agitation is continued. Agitation is continued for an additional 7 minutes after which the pellets are removed from the pelletizing equipment and dried to a water content of about 0.5–1.0%. The final pelleted product has a density of 18.25 lbs./cu. ft. and a size range of 85% +20 −60 mesh U.S. standard sieve series. Samples of −10 mesh, +10 −20 mesh, +20 −60 mesh and fines are then extracted with benzene as in Example I to give percent of extractable oil in each fraction of 4.70%, 4.75%, 4.80% and 4.80% respectively, demonstrating that a uniform oil distribution is obtained. As in Example I, the pellets are resistant to breakage under normal conditions and are readily incorporated in printing ink vehicles.

*Example III*

100 parts of a loose, ink-grade carbon black as in Example II are similarly agitated while 105 parts of water are added by spraying. After agitating for 4 minutes to initiate pellet formation, a 40% aqueous emulsion of a printing ink mineral oil prepared by mixing 18 parts of oil and 27 parts of water using 0.5% by volume based on oil of Ethofat 142/15, is then sprayed on the black while agitation is continued. Agitation is continued for an additional 6 minutes after which the pellets are removed from the pelletizing equipment and dried to a water content of 0.5=1.0%. The final pelleted product has a density of 16.9 lbs./cu. ft. and a size range of 85% +20 −60 mesh U.S. standard sieve series. Samples of −10 mesh, +10 −20 mesh, +20 −60 mesh and fines are then extracted with benzene as in Example I to give percent extractable oil in each fraction of 17.95%, 17.90%, 17.90% and 17.98% respectively, demonstrating that a uniform oil distribution is again obtained. As in the previous examples, breakage and dispersion properties are excellent.

*Example IV*

100 parts of loose, ink-grade carbon black as in Example II are agitated in carbon black pelleting equipment of conventional design while water is added to it by spraying. A total of 110 parts of water are added and the mixture agitated for 5 minutes to initiate the formation of pellets. A 32.5% aqueous emulsion of a printing ink mineral oil prepared by mixing 13 parts of oil and 27 parts of water using 0.5% by volume based on oil of Arquad 2C is then sprayed on the black while agitation is continued. Agitation is continued for an additional 6 minutes after which the pellets are removed from the pelletizing equipment and dried to a water content of 0.5–1.0%. The final pelleted product has a density of 17.2 lbs./cu. ft. and a size range of 88% +20 −60 mesh U.S. standard sieve series. Samples of −10 mesh, +10 −20 mesh, +20 −60 mesh, and fines are then extracted with benzene as in Example I to give percent extractable oil in each fraction of 12.90%, 12.93%, 12.95%, and 12.93%, respectively, demonstrating that a uniform oil distribution is obtained. Breakage and dispersion properties are again excellent as in the previous examples.

I claim:

1. A process of preparing an oil-bearing pelleted carbon black which comprises: agitating water wet carbon black to initiate pelleting thereof; adding about 3% to about 25% by weight of an oil thereto in the form of an aqueous emulsion; continuing agitation until pelleting is complete and the oil is uniformly distributed through the resultant pellets; and subjecting the pellets to drying.

2. A process of preparing an oil-bearing pelleted ink-grade carbon black which comprises: agitating a mixture of carbon black and water whereby pelleting of the carbon black is initiated; adding thereto an aqueous emulsion of an oil, said oil being about 3% to about 25% by weight of the carbon black; continuing agitation until pellets of about a preselected density and size are obtained having oil uniformly distributed therethrough; and subjecting the pellets to drying.

3. A process of preparing an oil-bearing pelleted ink-grade carbon black in which a total water content comprising about 90–165% by weight of the carbon black is employed which comprises: agitating a wet mixture comprising loose carbon black and about 70–90% of the total water content, whereby pelleting of carbon black is initiated; continuing agitation until the pellets approach preselected density and size values; adding thereto an aqueous emulsion of an oil comprising the balance of the total water content and about 3.0% to about 25% of an oil by weight of the carbon black; continuing agitation until pellets of about the preselected density and size are obtained having oil uniformly distributed therethrough, and subjecting the pellets to drying.

4. A process according to claim 3 in which the oil is a printing ink oil.

5. A process according to claim 3 in which the oil is a mineral oil.

6. A process according to claim 3 in which the oil content of the emulsion is about 5–20% by weight of carbon black.

References Cited in the file of this patent

UNITED STATES PATENTS

| | | |
|---|---|---|
| 2,635,057 | Jordan | Apr. 14, 1943 |
| 2,699,381 | King | Jan. 11, 1955 |
| 2,771,347 | Beck et al. | Nov. 20, 1956 |
| 2,848,347 | Rushford | Aug. 19, 1958 |
| 2,942,299 | Larson | June 28, 1960 |

UNITED STATES PATENT OFFICE
CERTIFICATE OF CORRECTION

Patent No. 3,005,725            October 24, 1961

Alton E. Daniell

It is hereby certified that error appears in the above numbered patent requiring correction and that the said Letters Patent should read as corrected below.

Column 2, line 62, for "70-80%" read -- 70-90% --.

Signed and sealed this 5th day of June 1962.

(SEAL)
Attest:

ERNEST W. SWIDER
Attesting Officer

DAVID L. LADD
Commissioner of Patents